(12) United States Patent
Nakayama et al.

(10) Patent No.: US 7,021,274 B2
(45) Date of Patent: Apr. 4, 2006

(54) FUEL INJECTION EQUIPMENT, INTERNAL COMBUSTION ENGINE, AND CONTROL METHOD OF FUEL INJECTION EQUIPMENT

(75) Inventors: Yoko Nakayama, Hitachi (JP); Yoshihiro Sukegawa, Hitachi (JP); Toshiharu Nogi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/612,153

(22) Filed: Jul. 3, 2003

(65) Prior Publication Data

US 2004/0055560 A1    Mar. 25, 2004

(30) Foreign Application Priority Data

Jul. 5, 2002    (JP) .............................. 2002-196652

(51) Int. Cl.
*F02B 17/00*    (2006.01)
(52) U.S. Cl. ...................... 123/294; 123/295; 123/299; 239/533.11; 239/585.1
(58) Field of Classification Search ................ 123/294, 123/295, 299, 301, 305; 239/533.11, 533.12, 239/585.1–585.5
See application file for complete search history.

(56) References Cited

U.S. PATENT DOCUMENTS

| | | | | |
|---|---|---|---|---|
| 6,334,427 B1 * | 1/2002 | Nakayama et al. | ......... | 123/305 |
| 6,668,793 B1 * | 12/2003 | Okamoto et al. | ........... | 123/299 |
| 6,702,194 B1 * | 3/2004 | Nakayama et al. | ........... | 239/88 |
| 6,705,275 B1 * | 3/2004 | Fukuzumi | ................... | 123/295 |
| 6,722,340 B1 * | 4/2004 | Sukegawa et al. | .......... | 123/305 |
| 6,732,703 B1 * | 5/2004 | Eckerle et al. | .............. | 123/298 |
| 6,748,919 B1 * | 6/2004 | Abo et al. | .................. | 123/299 |

FOREIGN PATENT DOCUMENTS

JP    2001-214744    8/2001

* cited by examiner

*Primary Examiner*—John T. Kwon
(74) *Attorney, Agent, or Firm*—Crowell & Moring LLP

(57) ABSTRACT

A fuel injection equipment to control the instability of combustion when the airflow is weak, and improve the fuel cost. A fuel injection equipment for an cylinder injection type and spark ignition type internal combustion engine that injects gasoline directly to a combustion chamber, wherein the top angle at the point of fuel spray in the pressurized atmosphere of absolute pressure 0.5 MPa is from −10° to 10°. Further, the fuel is injected at the compression stroke of the internal combustion engine which installs the fuel injection equipment, and said internal combustion engine is started.

5 Claims, 13 Drawing Sheets

FIG. 8   SPRAY VERTICAL SECTION (PRESSURIZED)
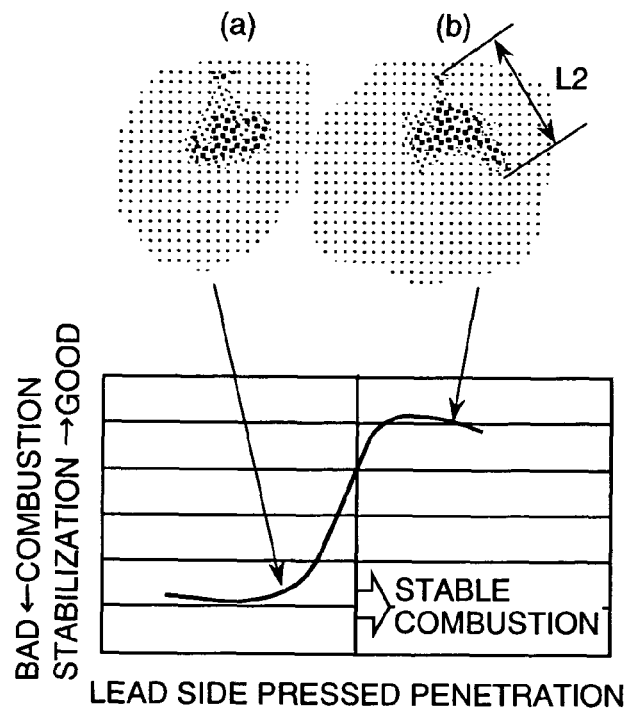
FIG. 9   SPRAY HORIZONTAL SECTION
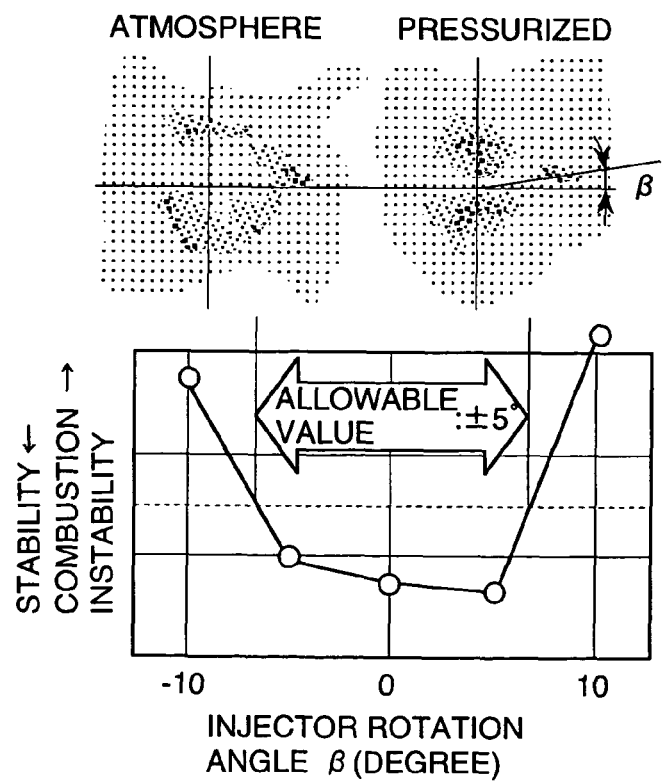

FIG. 10
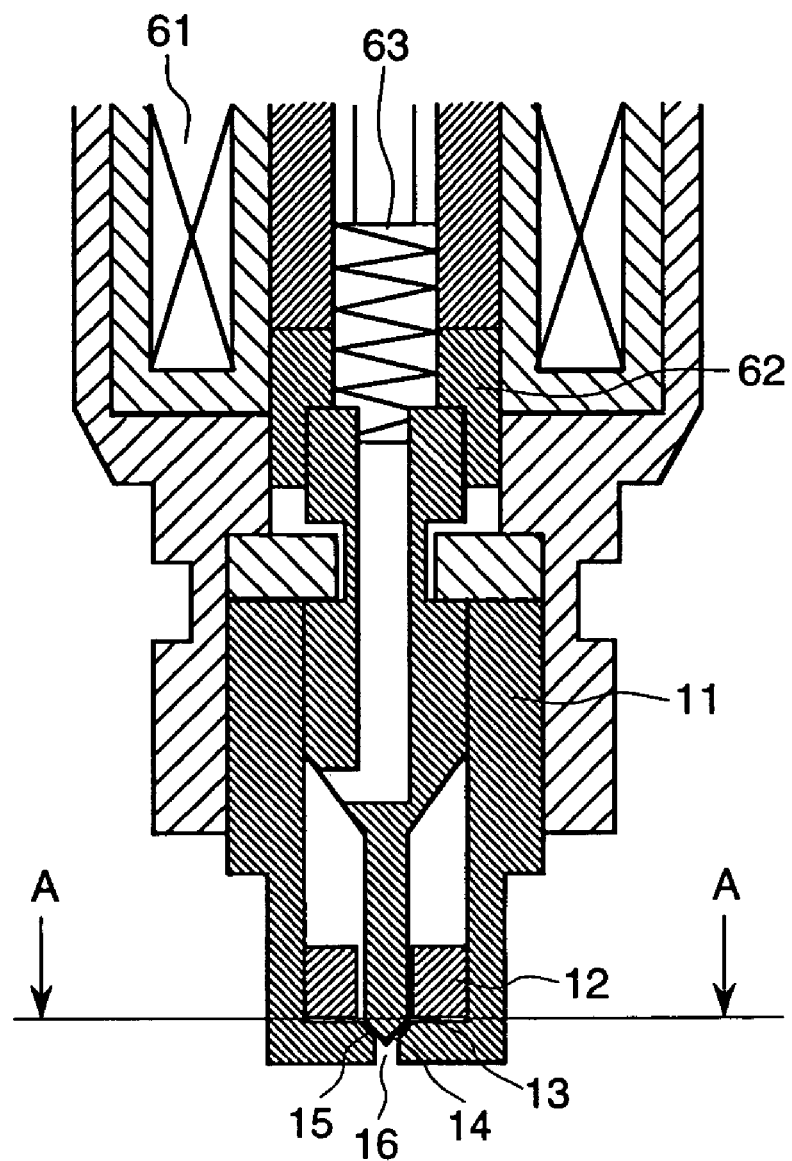
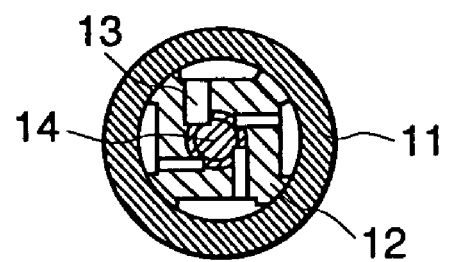
A-A SECTION

FIG. 11
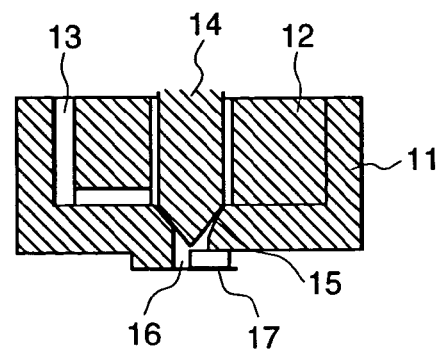
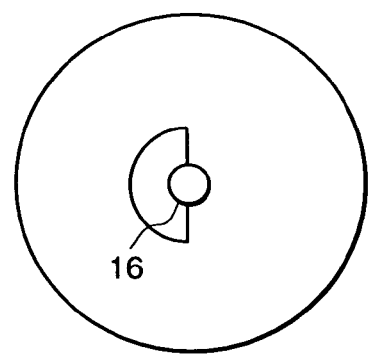
FIG. 12
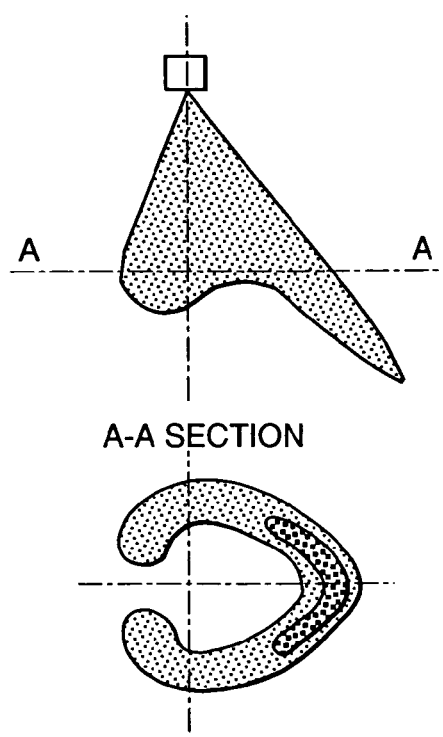
A-A SECTION

A-A SECTION

FIG. 17
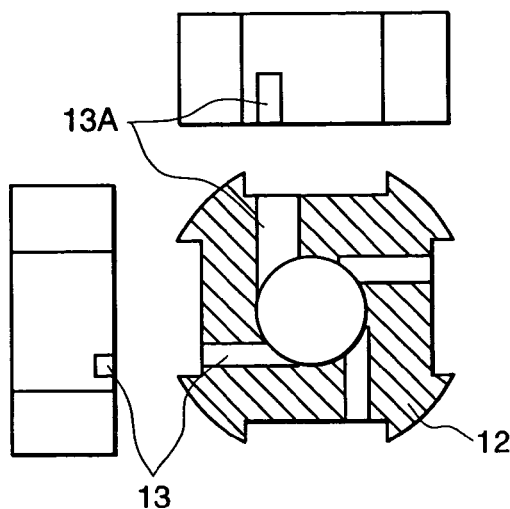
FIG. 18
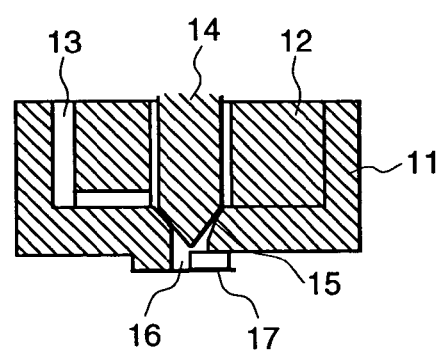
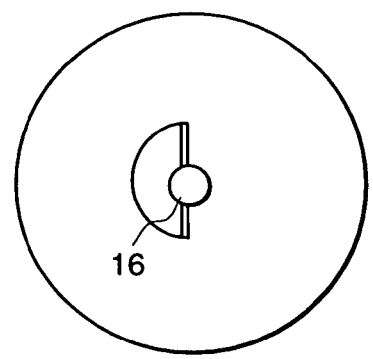

FIG. 19
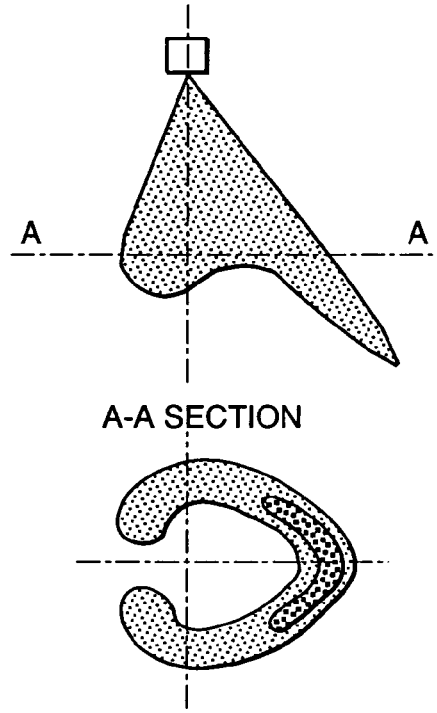
A-A SECTION
FIG. 20
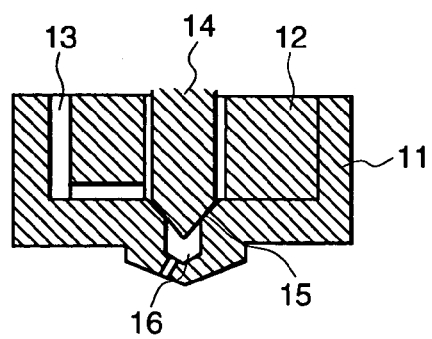
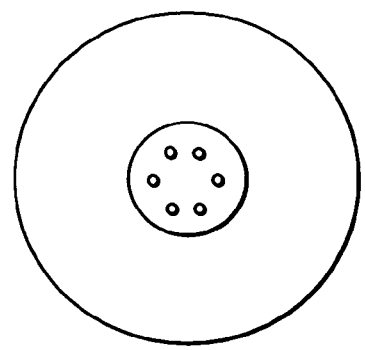

FIG. 21
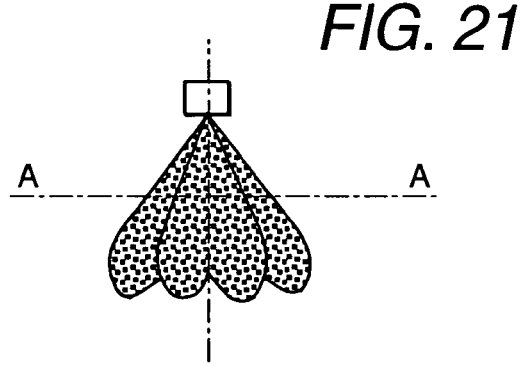
A-A SECTION
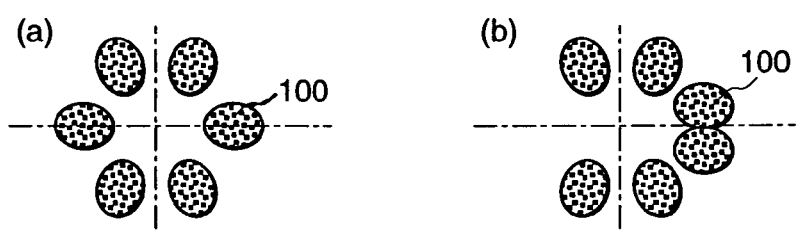
FIG. 22
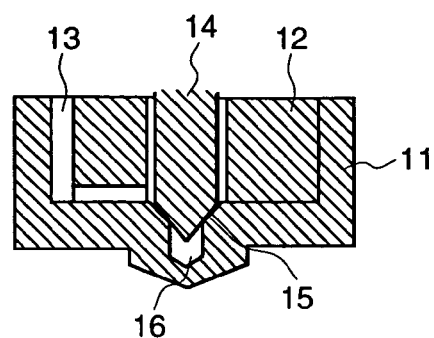
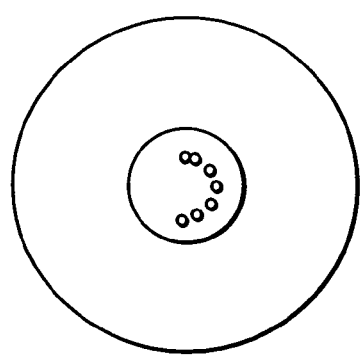

FIG. 23
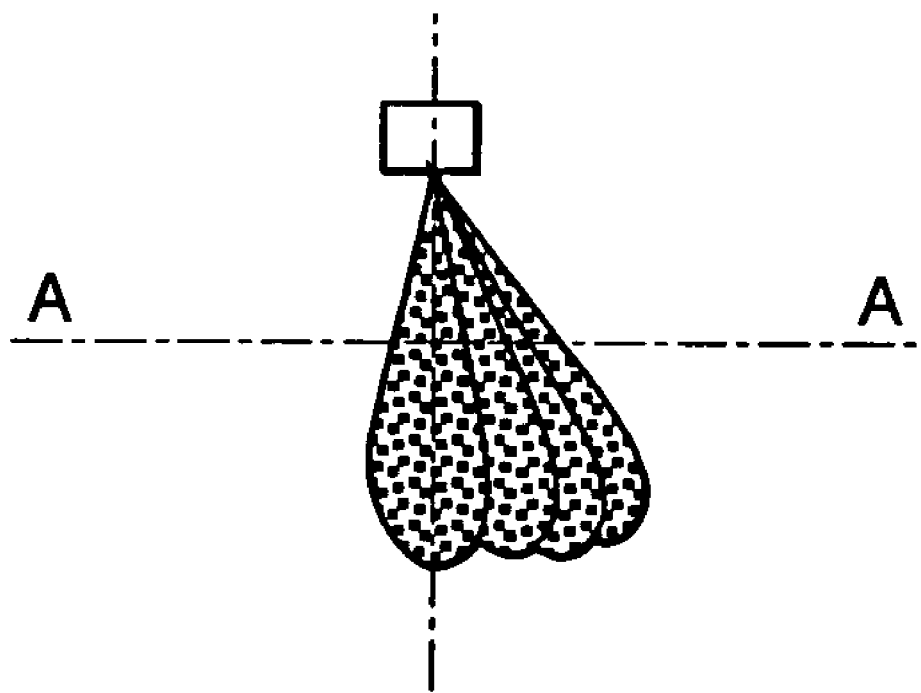
A-A SECTION
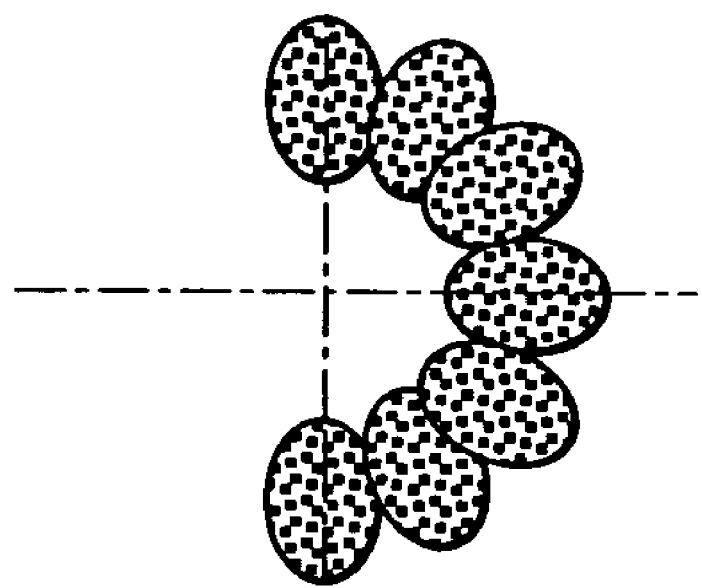

FUEL INJECTION EQUIPMENT, INTERNAL COMBUSTION ENGINE, AND CONTROL METHOD OF FUEL INJECTION EQUIPMENT

BACKGROUND OF THE INVENTION

The present invention relates to a method of controlling the fuel injection equipment, an internal combustion engine and a fuel injection equipment.

In the Japanese Patent Application No. 2001-214744, it has been described that an excellent, homogeneous air-fuel mixture can be formed even when a large amount of fuel is necessary in the homogeneous combustion, in the fuel injection equipment for an cylinder injection type and spark ignition type internal combustion engine which can execute the stratification combustion of the fuel injection at the compression stroke and the homogeneous combustion of the fuel injection at the intake stroke.

In the prior art, the best fuel spray form of the air guide type cylinder injection is not referred. Further, the air-fuel mixture cannot reach the sparking plug because the pressure in the combustion chamber is high when the air-fuel ratio is made a lean state to improve the fuel cost, and the stable combustion cannot be performed. In a word, there is a limit in the improvement of the fuel cost.

SUMMARY OF THE INVENTION

The present invention is performed to solve the problem in the above-mentioned prior art.

An object of the present invention is to control the instability of combustion when the airflow is weak, and improve the fuel cost.

In an cylinder injection type and spark ignition type internal combustion engine which comprises a combustion chamber formed between a cylinder head and a piston, an intake valve and an exhaust valve arranged in said cylinder head, a sparking plug, a fuel injection valve arranged at angles with the horizontal plane of the combustion chamber, and which injects gasoline directly to said combustion chamber, the fuel injection valve that top angle ($\theta$) at the point of fuel spray in the pressurized atmosphere (Absolute pressure: 0.5 MPa) exists in the range of $-10°$ to $10°$ is adopted.

Because it is possible to make fuel spray reach the plug even when the airflow is weak, the stable combustion is obtained. As a result, the combustion efficiency can be improved, and thus the fuel cost can be improved.

BRIEF DESCRIPTION OF DRAWINGS

FIG. 8 shows the effect of penetration of lead fuel spray.

FIG. 9 shows the effect of existence angle of lead fuel spray.

FIG. 10 is a sectional view of the fuel injection valve.

FIG. 11 shows a fuel injection valve used in the first embodiment.

FIG. 12 shows the fuel spray by the fuel injection valve of FIG. 11.

FIG. 17 illustrates a third swirler improvement idea.

FIG. 18 illustrates an improvement idea for the nozzle step.

FIG. 19 shows the fuel spray from the fuel injection valve of FIG. 18.

FIG. 20 shows the first nozzle form at the point of the fuel injection valve.

FIG. 21 shows the fuel spray by the first nozzle form.

FIG. 22 shows a second nozzle form at the point of the fuel injection valve.

FIG. 23 shows the fuel spray by the second nozzle form.

DESCRIPTION OF THE PREFERRED EMBODIMENTS

In the cylinder injection engine, the fuel injection valve is provided at angle of 20° to 50° with the horizontal plane of the combustion chamber and between two intake ports of the combustion chamber. The airflow formed by the flow generation means such as the swirl control valves which are provided in the intake port is mixed with the fuel injected aiming at the cavity provided to the piston when the stratification burns. The air-fuel mixture is led to the sparking plug arranged in the center part of the combustion chamber, and ignited. It is necessary to provide for a necessary fuel spray requirement when the air-fuel ratio is made a lean state to improve the fuel cost and perform the stratification combustion in the cylinder injection type and spark ignition internal combustion engine. However, there is a problem that fuel spray do not reach the sparking plug because of the increase in atmosphere pressure of the combustion chamber, and the stratification combustion in the cylinder injection engine of the side injection type becomes unstable when air-fuel ratio was made a lean state for the fuel cost improvement. The fuel injection valve which has the spray characteristic that the fuel spray reaches the sparking plug even when the combustion chamber pressure is high is used for that. In a word, the top angle at the point of fuel spray, the penetration in the direction of the plug, and the range of the existence of the fuel spray in the rotation direction of the fuel injection valve are given. Further, to meet the requirement, the fuel injection valve structure is changed.

Figure 1:
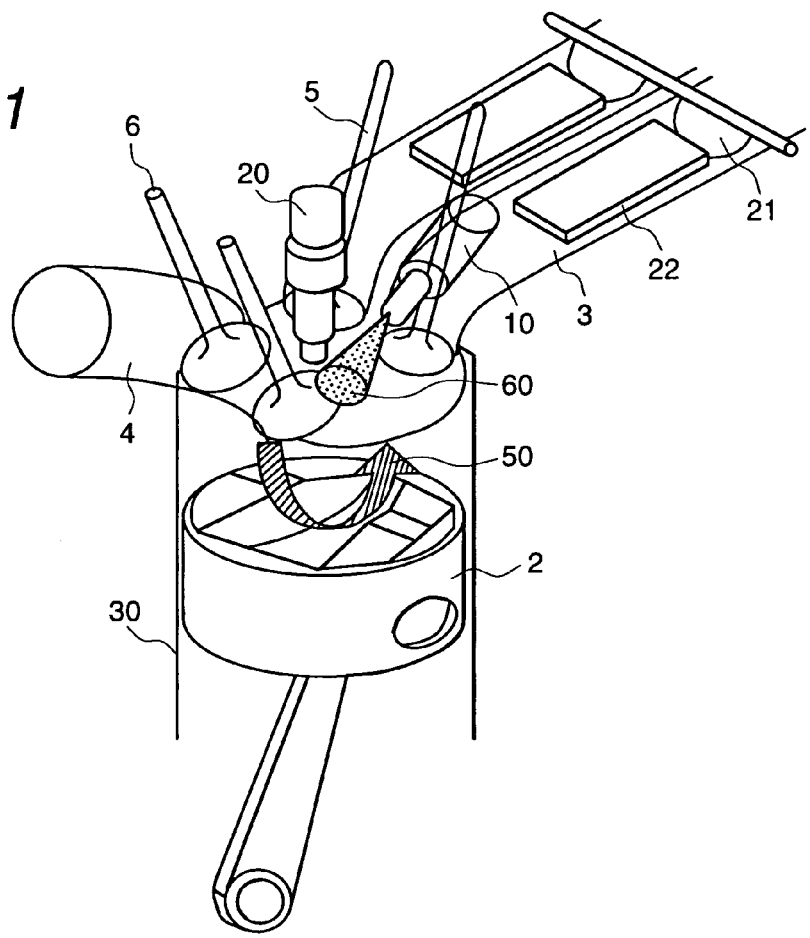
FIG. 1 is a perspective view of an engine according to the first embodiment.
Figure 2:
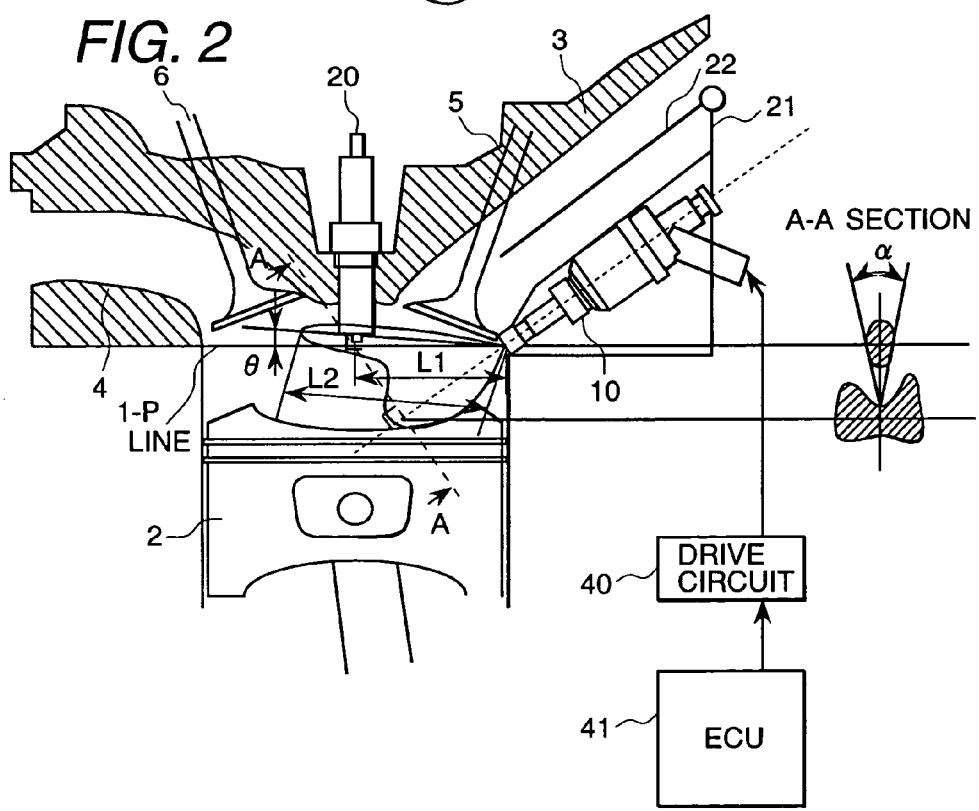
FIG. 2 is a sectional view of the engine according to the first embodiment.

An embodiment of the cylinder injection engine is shown in FIG. 1 and FIG. 2.

An engine 30 is provided with an intake port 3 and an exhaust port 4. The intake port 3 and the exhaust port 4 lead to the combustion chamber respectively through an intake valve and an exhaust valve 6. Numeral 2 designates a piston, 20 an electrode of the sparking plug arranged in the upper part of the combustion chamber, and 10 a fuel injection valve to inject the fuel directly to the combustion chamber. The engine 30 has a board 22 which partitions the intake pipe up and down and an airflow control valve 21 provided at the beginning point of the board. Thereby, forward tumble airflow 50 toward the exhaust valve 6 from the intake valve 5 and toward the piston 2 is formed in the combustion chamber. The strength of the airflow 50 can be changed according to the opening of electronically controlled airflow control valve 21. The piston 2 has a shallow cavity to maintain the tumble airflow easily, the sparking plug electrode 20 which sparks to burn is arranged in the vicinity of the center of the combustion chamber, and the fuel injection valve 10 which supplies the fuel directly to the combustion chamber is arranged at the angle of about 36° with respect to the horizontal line between two intake valves 5 provided in the combustion chamber.

The fuel injection valve is a solenoid valve which opens and shuts by the control signal from ECU 41. The coil of the fuel injection valve operates when an injection signal from the ECU is input to the fuel injection valve drive circuit 40, the plunger is pulled up, and the fuel is injected to the combustion chamber. The fuel injection valve used in this embodiment is made by working the step to the point of the conventional swirl fuel injection valve.

The fuel spray forms asymmetrical and conical fuel spray as shown in FIG. 2. The fuel spray with large penetration directed to the sparking plug is called lead fuel spray, and the fuel spray with small penetration is called main fuel spray.

It is necessary to meet the undermentioned fuel spray requirement on the fuel spray unit performance to do the stratification combustion during the idling and the low revolution in the cylinder injection engine having the above-mentioned configuration. In the vertical fault fuel spray form after 2.7 ms from the beginning of the injection a t the pressurized atmosphere of absolute pressure 0.5 MPa by which the combustion chamber is imitated, 1. Top angle $\theta$ of the fuel spray must be the range of $-10°$ to $10°$,
2. Penetration L2 of the lead fuel spray must be larger than distance L1 from the sparking plug electrode to the fuel injection valve.

In the horizontal fault fuel spray form after 4.4 ms from the beginning of the injection at the pressurized atmosphere of absolute pressure 0.5 MPa by which the combustion chamber is imitated, 3. The sparking plug electrode must exist within the existence angle $\alpha$ of the lead fuel spray.

The method of verifying the fuel spray and the definition of the above-mentioned parameter is explained.

Figure 3:
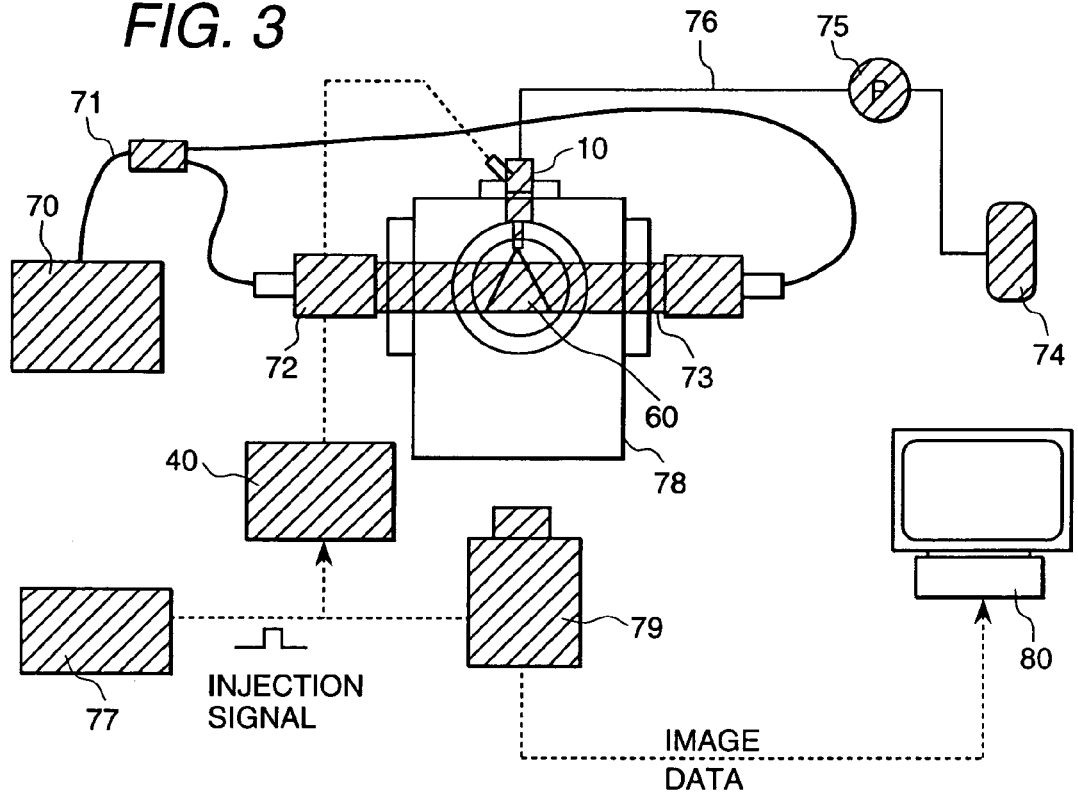
FIG. 3 shows the first fuel spray imaging equipment.
Figure 4A:
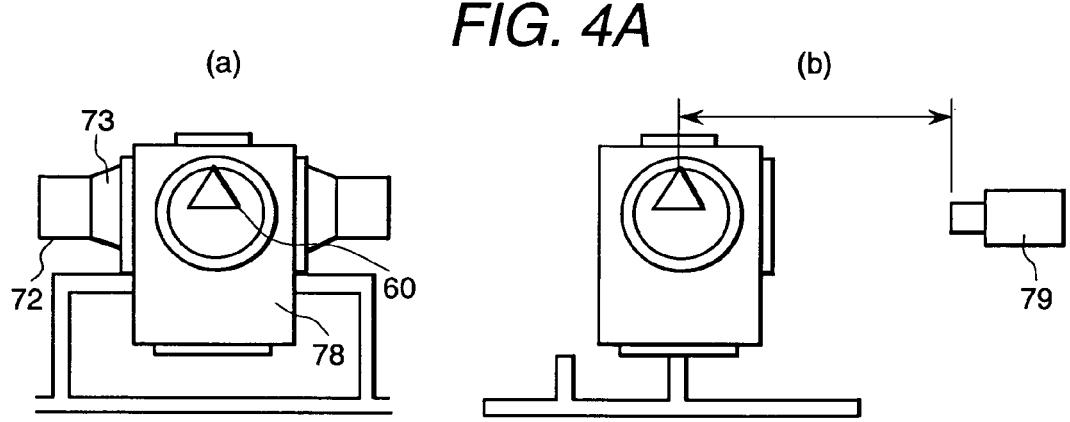
FIG. 4A and FIG. 4B show the second fuel spray imaging equipment.
Figure 4B:
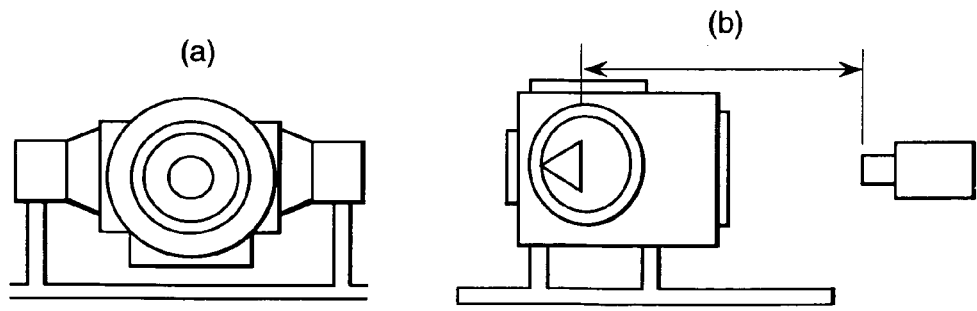

The configuration of an imaging equipment for the fuel spray is shown in FIG. 3. The fuel pressure and the injection quantity in the idling operating condition where it is most difficult to obtain the stability of the combustion in the regular stratification operation. In this embodiment, fuel pressure 7 MPa and injection quantity 12.5 mcc are set as a representative condition. Fuel injection valve 10 is arranged in the upper part of a fuel spray container 78 with 300 mm or more in height and 200 mm or more in diameter. The fuel is supplied from a fuel tank 74, pressured by a fuel pump 75, and controlled to the fixed fuel pressure. Afterwards, the fuel passes a high-pressure piping 76, and is supplied to the fuel injection valve through fuel injection valve drive circuit 40 to drive it. Further, this signal is branched, and is made the shutter trigger for a high-speed and high sensitivity camera 79. A picture is taken after the fixed delay (a vertical section: 2.7 ms and the horizontal section:4.4 ms). An optical system branches the light from a halogen light source 70 through an optical fiber 71. A sheet light 73 of about 5 mm in thickness is made by a cylindrical lens. When the picture of fuel spray vertical section is taken, the light is irradiated from two opposed directions as shown in FIG. 4A, and when the picture of the horizontal section is taken, it is as shown in FIG. 4B. The camera is set up as shown in FIG. 4. Further, it is set that the section where the halogen sheet light is irradiated includes the fuel spray injected in the direction of the sparking plug when taking a picture of a vertical section, and the light is irradiated to the position which corresponds to the distance from the fuel spray point to the sparking plug electrode in the combustion chamber when taking a picture of the horizontal section. The scattered light by the fuel spray on eac h section is taken a picture by the camera. The shutter is set at a speed (ex. 222 µs) of the extent where fuel spray does not flow. The light intensity and the camera aperture is set brightly within the range where the halation is not caused. Further, the condition of the internal pressure of internal pressure of the cylinder when injecting fuel is imitated, and the pressure in the chamber 78 is assumed to be 0.5 MPa (absolute pressure). Further, the fuel spray image taken a picture is processed by a picture processing personal computer 80. When the highest brightness of the image is assumed to be Imax, the brightness part of Imax of 40% or more is the fuel spray existence part.

Figure 5:
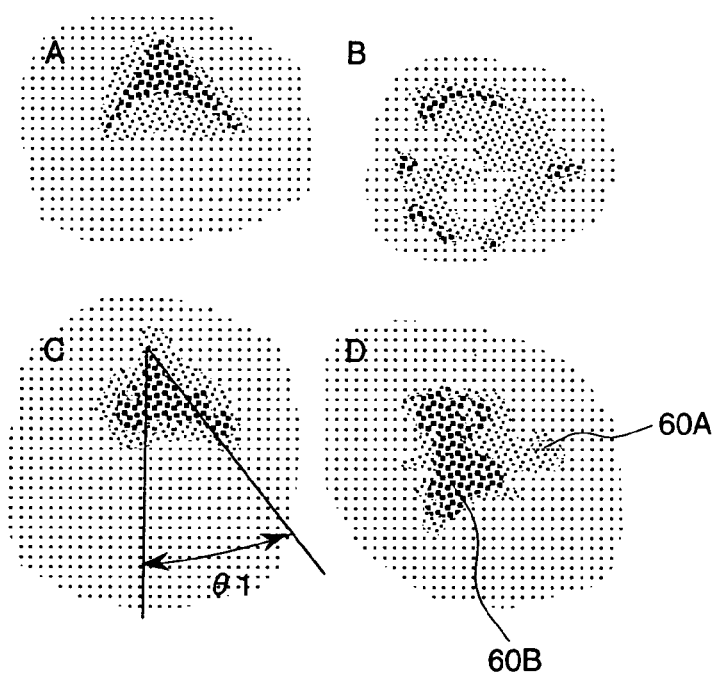
FIG. 5 shows a fuel spray characteristic.

The example of the fuel spray taken a picture is shown in FIG 5. A: Atmospheric pressure vertical section (Delay=1.3 ms), B: Atmospheric pressure horizontal section (Delay=1.8 ms), C: Pressurized vertical section (Delay=2.7 ms), and D: A photograph of pressurized horizontal cross section (Delay=4.4 ms). The fuel spray used in this embodiment is fuel spray of a hollow cone form in the atmospheric pressure, and the fuel spray concentrated part exists in the sparking plug side (picture on the right hand). In the pressurized atmosphere, the fuel spray in the direction of the sparking plug becomes strong penetration and one in the direction of the piston (picture on the left hand) becomes weak penetration. Further, the fuel spray takes the form that the lead fuel spray 60A toward the sparking plug and other main fuel spray 60B separate in the pressurized horizontal cross section.

Figure 6:
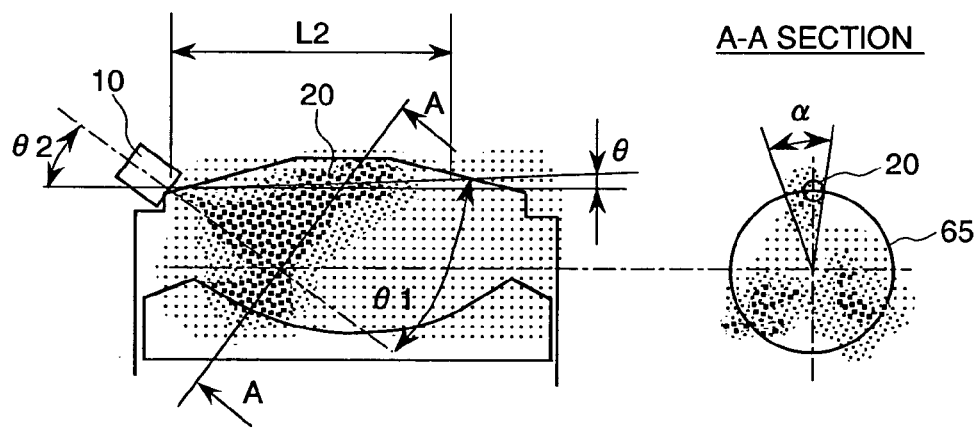
FIG. 6 shows the definition of fuel spray.

The definition of the spray characteristic is shown in FIG. 6 in an example of such fuel spray. The angle which the central axis of the fuel injection valve and the line which connects the part where spray penetration is large and the fuel spray point makes is assumed to be $\theta 1$ in the pressurized vertical section. When a plurality of parts where the spray penetration is large exists, a part that is nearest to the sparking plug is defined as the lead fuel spray. Further, when the angle which the central axis of the fuel injection valve and the line which connects the fuel spray point of the fuel injection valve and the sparking plug electrode 20 makes is assumed to be $\theta 2$ in the engine, the top angle $\theta$ in the fuel spray point is shown by the undermentioned expression.

$$\theta = \theta 1 - \theta 2$$

Next, the distance between the fuel spray traveled point and the fuel spray point which is defined by the above-mentioned as the lead fuel spray is defined as lead fuel spray penetration L2.

Further, the existence angle $\alpha$ of the lead fuel spray is defined as the angular range that the above-mentioned lead fuel spray exists on circumference 65, of which center is on the central axis of the fuel injection valve and the position where the sparking plug electrode 20 exists is included in the fuel spray horizontal section (A—A section in figure).

Figure 7:
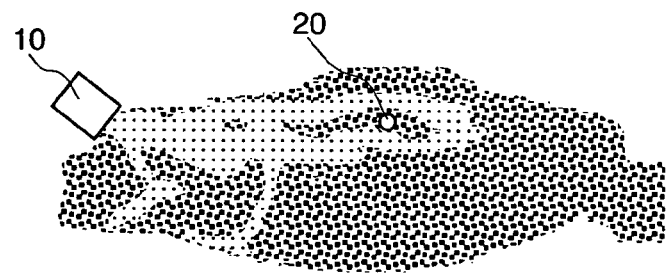
FIG. 7 shows the result of air-fuel mixture simulation.

The operation and the effect of the cylinder injection engine according to this embodiment are explained when the cylinder injection engine is operating at the middle or the high load, the ignition and combustion are done after the fuel is injected during the intake stroke and the homogeneous air-fuel mixture is formed. Because the time from the injection to the ignition is long, the influence by the fuel spray form is a little. On the other hand, because the time from the injection to the ignition is short in the stratification combustion at the low load, the influence by the spray characteristic is great. In the stratification combustion of the engine of this configuration, the injected fuel is given to the sparking plug by the tumble airflow formed in the combustion chamber, and the stratification is formed. Further, the flow toward the ignition plug is formed by the lead fuel spray, and the main fuel spray is made to the stratification to the plug in the low revolution condition in which the tumble airflow is weak. However, when the air-fuel ratio is made a lean state to improve the fuel cost, the pres sure of the combustion chamber rises, and it becomes difficult for the fuel spray to reach the plug. The result of simulation for the distribution of the air-fuel mixture is shown in FIG. 7. The main fuel spray is decelerated due to the atmosphere pressure and cannot reach the sparking plug though the lead fuel spray can reach the sparking plug having large spray penetration. It is important to set to meet the requirement of this embodiment the fuel spray form (the top angle θ at the point of the fuel spray, the lead fuel spray rotation angle α, and the lead fuel spray penetration L2) in the pressurized atmosphere where the compression stroke is simulated, in order to make the lead fuel spray surely reach the sparking plug. In the graph of FIG. 8, the lead fuel spray penetration is designated in the ordinate, and the combustion stability is designated in the abscissa. When the lead fuel spray penetration L2 is short as shown in the photograph of (a), the stable combustion region is not obtained. Oppositely, the fuel spray for which some length is secured like (b) can give the stable combustion. In a word, if the lead fuel spray can reach the sparking plug, the stable combustion is obtained.

Further, when the fuel injection valve is rotated and installed as shown in FIG. 9, the stable combustion becomes difficult because the direction of the lead fuel spray shifts from the plug. A permissible value of the rotation direction is ±5° for this fuel injection valve. However, it is generally important that the sparking plug electrode exists within the range of the lead fuel spray existence angle α because it is thought that this value has sensitivity in the lead fuel spray existence angle α.

It is possible to operate at the low revolution in the super-lean stratification state where the air-fuel ratio is 40 or more by meeting the above-mentioned fuel spray requirement, and to improve the fuel cost.

FIG. 10 is a block diagram of the fuel injection valve used for the above-mentioned embodiment. The operation of the fuel injection valve is explained. The valve body 14 is pressed against the valve seat 15 by a spring 63, and the seal is done when the valve is closed. The magnetic circuit is formed by a coil 61 when an open valve signal is given by the electronic control unit, and the valve body 14 rises by the electromagnetic force generated in the direction where a magnetization part 62 of the valve body is lifted. The fuel flows in from the upper part of the fuel injection valve, passes a passage 63 in the valve body, and reaches the nozzle. Swirler 12 by which the turn is given to the fuel is arranged in the nozzle 11. The fuel is injected from the space between the valve body 14 and the valve seat 15 to the combustion chamber through nozzle hole 16 after passing ditch 13 provided in the swirler.

The nose form of the nozzle of the fuel injection valve is shown in FIG. 11. The step 17 is provided on around the half position of the nozzle hole. Thereby, the discontinuity part and the fuel concentrated part are formed in a part of the hollow fuel spray injected from the conventional turn type fuel injection valve. FIG. 12 shows the fuel spray form under the atmospheric pressure formed with the nozzle hole of FIG. 11. The above figure shows a vertical section, and the figure below shows a horizontal section. One of the fuel spray from this fuel injection valve becomes discontinuous, and the opposing side of the fuel spray forms a fuel concentrated part. The position and the amount of this fuel spray distribution can be changed by the size and the position of the step of the nozzle. Said embodiment are the one to direct the fuel concentrated part to the sparking plug.

Figure 13:
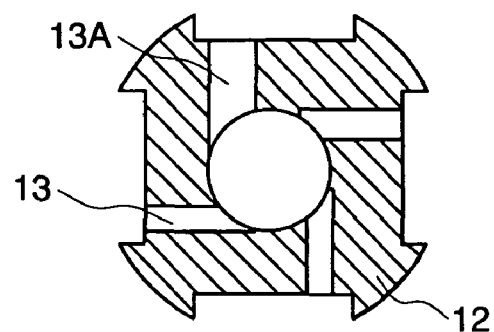
FIG. 13 illustrates a first swirler improvement idea.
Figure 14:
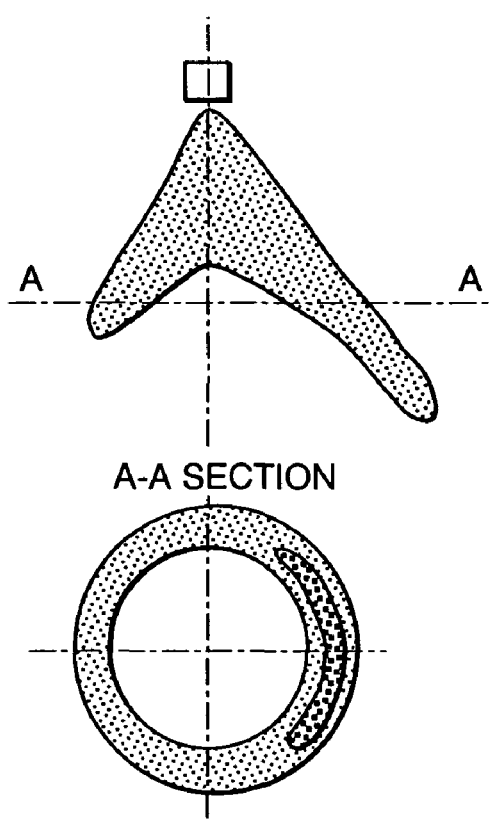
FIG. 14 shows the fuel spray when the swirler of FIG. 13 is used.
Figure 15:
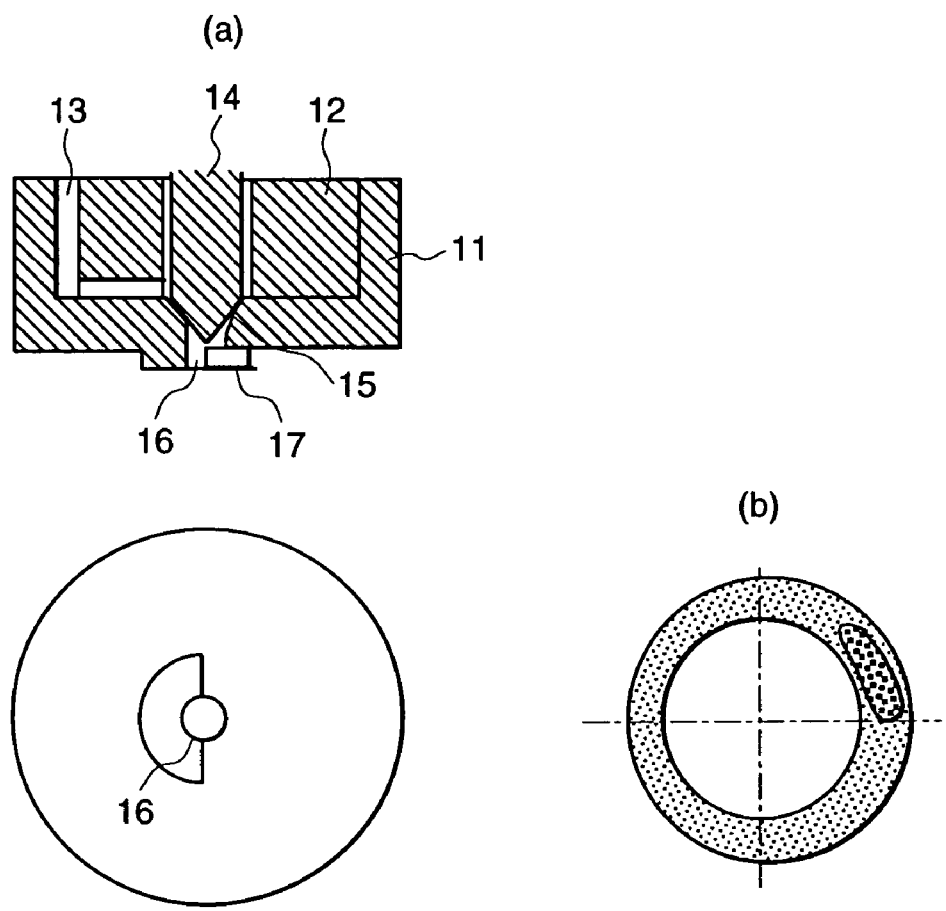
FIG. 15 shows the fuel spray of FIG. 14 and positioning of nozzle difference.

In said embodiment, the combustion can be stabilized by assuming the fuel spray characteristic absorbed with the individual dispersion of fuel spray. In the structure of FIG. 11, there is a problem that the direction of the lead fuel spray shifts by the misalignment by the working. One width of the turn-ditches 13 of the swirler 12 is expanded, and the fuel amount which flows in is increased as shown in FIG. 13. As a result, the fuel spray can be formed so that there may be the fuel deflection in one direction as shown in FIG. 14. The fuel concentrated part can be obtained stably by setting a direction (b) of the fuel spray and a direction (a) of nozzle step 17 as shown in FIG. 15. In a word, it is thought that the lead fuel spray penetration can be stably secured.

Figure 16:
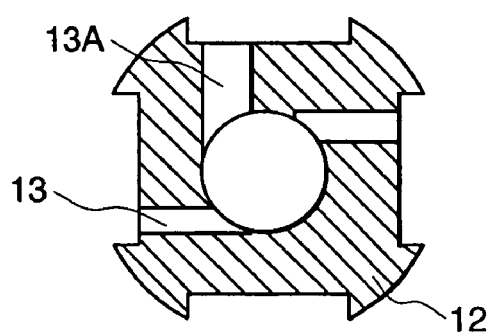
FIG. 16 illustrates a second swirler improvement idea.

Similarly, it is possible to make easy to form the discontinuity part of the fuel spray with the lead penetration securing to eliminating the ditch at the opposing side of the wide ditch 13A as shown in FIG. 16.

In two said methods of changing the swirler structure, the method of changing not the width of the ditches of the swirler but the height of the ditch as shown in FIG. 17 can be thought. This problem is evaded by changing the height of the ditch though in the expansion of the width of the ditches, there is a problem that the swirl force decreases when expanded in the direction of the center of the swirler. The effect is similar to said method.

The number other than four may be used without trouble, and the size of ditches more than one may be changed in these methods. Further, both of the ditch width and the ditch height may be changed.

It is possible to expand the lead fuel spray existence angle α as another means for the combustion stabilization. The unstable combustion due to the displacement of the installation of the fuel injection valve can be recovered by the fuel spray form.

It is effective for the expansion of the lead fuel spray existence angle α that the step provided at the nozzle hole is provided not at rights but at angle of 0° to 30° with respect to the vertical angle. The fuel concentration can be eased by applying the angle as shown in FIG. 19, and the lead fuel spray becomes to exist widely. However, because there is fear that the lead penetration L2 decreases by distributing the flow, the lead fuel spray existence angle α can be expanded with securing the lead fuel spray penetration by combining the swirler form shown in FIG. 13, FIG. 16, and FIG. 17 and the nozzle configuration of FIG. 18.

Further, there is a porous fuel injection valve as other injection valve structures to achieve said embodiment. A lot of holes 16 of the minute diamet er of about φ0.05 to 0.3 mm are arranged in the nozzle 11 as shown in FIG. 20, and the fuel spray injected in the multi-directions as shown in FIG. 21(*a*) is formed. Various fuel sprays can be formed according to the number, the size, and the direction of the nozzle hole. Further, it is easy to control the direction of the fuel spray because the fuel spray rolling decrease caused by the difference between the inside and outside pressures of fuel spray as the swirling fuel spray is not caused. Said embodiment can be achieved by designing to meet the demand of the top angle at the point of the fuel spray 100 in the figure, the lead fuel spray penetration, and the lead fuel spray existence angle, and installing the fuel injection valve so that the fuel spray 100 may be directed to the plug. It is effective that the fuel spray injected from two or more holes is centralized in the direction of the plug and the flow distribution is expanded as shown in FIG. 21(b) in order to expand the lead fuel spray existence angle, although the flow distribution of one fuel spray is narrow in the porous fuel injection valve. However, because the interference with fuel spray combines the fuel spray to each other and leads to the expansion of the particle size, it is necessary to suppress interference to the minimum.

Further, it is desirable that the amount of fuel spray on the piston side from the central axis of the injector is small, and the fuel spray amount centralizes to the plug side to as shown ideally in FIG. 22 and FIG. 23. Especially, because it is difficult to suppress the penetration in the porous fuel injection valve, the fuel spray directed to the piston side collides with the piston, and becomes the factor of hydrocarbon and the smoke. Therefore, the fuel spray is arranged so that the fuel spray may be centralized to the plug side and the installation accuracy of the fuel injection valve should not become severe, namely, the lead fuel spray existence angle α can be greatly taken. In the swirler on the upstream in the porous fuel injection valve, it is not required that the ditch is arranged in the direction where the fuel turns.

Figure 24:
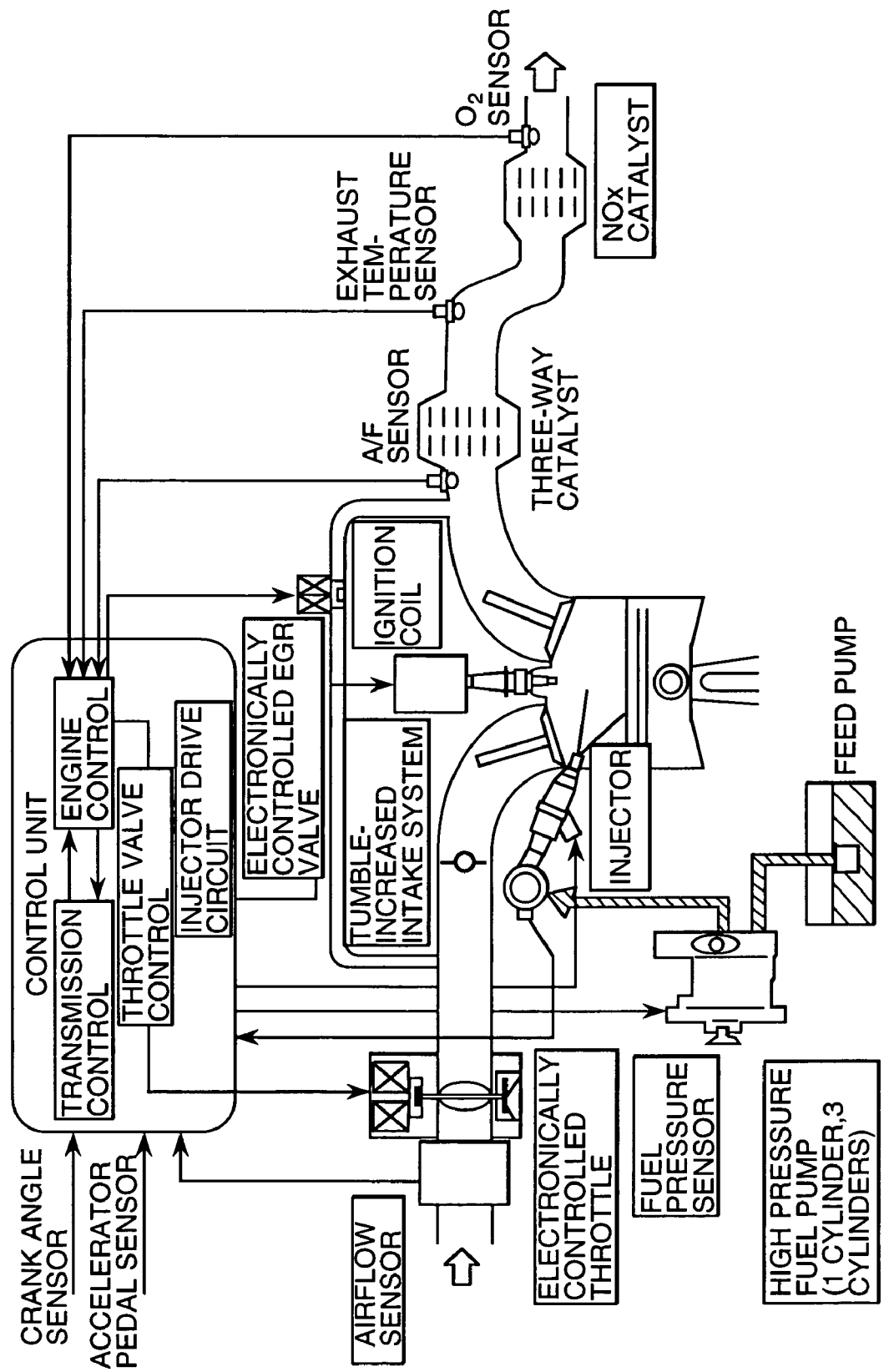
FIG. 24 shows an engine system.

The cylinder injection type internal combustion engine described in the above-mentioned is installed in, for example, the system shown in FIG. 24.

Another embodiment is explained.

There is a problem that a large amount of harmful exhaust constituent such as unburnt hydrocarbon etc. which originate in the fuel adhesion on the piston and the cylinder, because the injection is executed at the intake stroke at the cold start-up. Because the fuel is flowed directly to the sparking plug without the assistance of the piston wall and the airflow in the cylinder injection type internal combustion engine described in the above-mentioned embodiment, the combustion in the stratification can be performed even at start-up in which the airflow is weak. The fuel adhesion on the piston and the cylinder walls is decreased by the start-up in the stratification combustion. Therefore, the exhaust performance at start-up is improved, and the temperature of catalyst can be raised at the early stage. As a result, the effect that the purification efficiency of the catalyst is improved and the exhaust is decreased is achieved.

Further, the influence by the combustion change at the start-up in the stratification combustion is worried. Therefore, it is also effective to raise the exhaust gas temperature by switching to the lean stratification combustion in the course of the temperature rise process of the catalyst after fast idling speed is obtained even when the start-up in the homogeneous combustion is done, and to raise the temperature of the catalyst at the early stage.

Further, the fuel is divided into two times or injected at the intake stroke and the compression stroke. The fuel injected at the compression stroke is ignited, and the flame spread speed is delayed by the super-lean air-fuel mixture formed by the injection at the intake stroke. As a result, the heat generation is delayed, exhaust gas temperature is raised, and the catalyst is raised at the early stage.

Further, the airflow and the support of the piston form are made a minimum, the stratification is achieved according to the spray characteristic, and the fuel spray generation means to do the stability combustion can be provided.

Further, unstable combustion is controlled by making the combustible mixture a stratification in the vicinity of the sparking plug under the condition where the airflow is weak. As a result, fuel cost can be improved according to the embodiment. That is, the air-fuel mixture comes to reach the sparking plug even when the air-fuel ratio is lean, and the combustion stabilization and the fuel cost improvement can be achieved.

The instability of combustion can be controlled even when the airflow is weak according to the present invention, the fuel cost can be improved.

What is claimed is:

1. A fuel injection equipment for a cylinder injection type and spark ignition type internal combustion engine that injects gasoline directly to a combustion chamber,
    wherein the top angle at the point of fuel spray in the pressurized atmosphere of absolute pressure 0.5 MPa is from −10° to 10°,
    further comprising a nozzle hole, a valve seat in the upstream side of said nozzle hole, the valve body which opens and shuts the fuel passage by acting on said valve seats, and driving means for said valve body, and further comprising swirl providing means that gives the swirl movement to the fuel in the upstream side of said nozzle hole,
    wherein a stage difference is provided in the downstream aperture of said nozzle hole in the direction of the central axis line of the injection valve,
    wherein at least one turn-ditch provided to the swirl providing means is a first turn-ditch where the sectional area of the flow path is larger than that of other ditches.

2. A fuel injection valve for a cylinder injection type and spark ignition type internal combustion engine that injects fuel directly to a combustion chamber through a nozzle hole,
    wherein the top angle at the point of fuel spray in the pressurized atmosphere of absolute pressure 0.5 MPa is from −10° to 10°, a plurality of turn-ditches are arranged around the nozzle hole so as to guide the fuel toward the nozzle hole and to impart swirl movement to the fuel upstream of the nozzle hole,
    a predetermined one of the plurality of turn-ditches is larger in flow path sectional area than the remainder thereof and no turn-ditch is arranged the opposite side of said nozzle hole to the predetermined one turn-ditch.

3. The fuel injection equipment according to claim 1, wherein the height of said first turn-ditch is higher than the height of other ditches.

4. The fuel injection equipment according to claim 1, wherein the position of the injected fuel spray concentrated part and the position of the step of the nozzle hole opening are provided.

5. The fuel injection equipment according to claim 1, wherein said step of the nozzle hole opening has the angle of 0° to 30°.

* * * * *